United States Patent
Schilder et al.

(10) Patent No.: US 12,172,507 B2
(45) Date of Patent: Dec. 24, 2024

(54) ELECTRIC DRIVE SYSTEM FOR A MOTOR VEHICLE

(71) Applicant: MERCEDES-BENZ GROUP AG, Stuttgart (DE)

(72) Inventors: Tobias Schilder, Ludwigsburg (DE); Tobias Haerter, Stuttgart (DE); Jonathan Zeibig, Aalen (DE); Carsten Gitt, Stuttgart (DE); Klaus Riedl, Tübingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/684,353

(22) PCT Filed: Aug. 2, 2022

(86) PCT No.: PCT/EP2022/071748
§ 371 (c)(1),
(2) Date: Feb. 16, 2024

(87) PCT Pub. No.: WO2023/020836
PCT Pub. Date: Feb. 23, 2023

(65) Prior Publication Data
US 2024/0351417 A1 Oct. 24, 2024

(30) Foreign Application Priority Data
Aug. 19, 2021 (DE) ...................... 10 2021 004 236.0

(51) Int. Cl.
*B60K 1/02* (2006.01)
*B60K 17/04* (2006.01)
(Continued)

(52) U.S. Cl.
CPC .............. *B60K 1/02* (2013.01); *B60K 17/046* (2013.01); *B60K 17/165* (2013.01); *B60K 2023/043* (2013.01); *F16H 48/06* (2013.01)

(58) Field of Classification Search
CPC ...... B60K 1/02; B60K 17/046; B60K 17/165; B60K 2023/043; F16H 48/06–11
See application file for complete search history.

(56) References Cited

U.S. PATENT DOCUMENTS 7,384,357 B2 6/2008 Thomas et al.
9,221,334 B2 12/2015 Knoblauch
(Continued)

FOREIGN PATENT DOCUMENTS

AT 522931 A1 3/2021
CN 107985068 A 5/2018
(Continued)

OTHER PUBLICATIONS

International Search Report and Written Opinion mailed Nov. 23, 2022 in related/corresponding International Application No. PCT/EP2022/071748.
(Continued)

*Primary Examiner* — Tinh Dang
(74) *Attorney, Agent, or Firm* — PATENT PORTFOLIO BUILDERS PLLC

(57) ABSTRACT

A motor vehicle electric drive system includes first and second electric machines, arranged coaxial to each other and respectively having first and second rotors, a differential gear having a differential input shaft and a first and second differential output shafts arranged coaxially to the first rotor. A transmission stage has a transmission input shaft and a transmission output shaft. The transmission output shaft is connected in a rotationally fixed manner with the differential input shaft. A first switching element couples the first rotor
(Continued)

Figure 1:
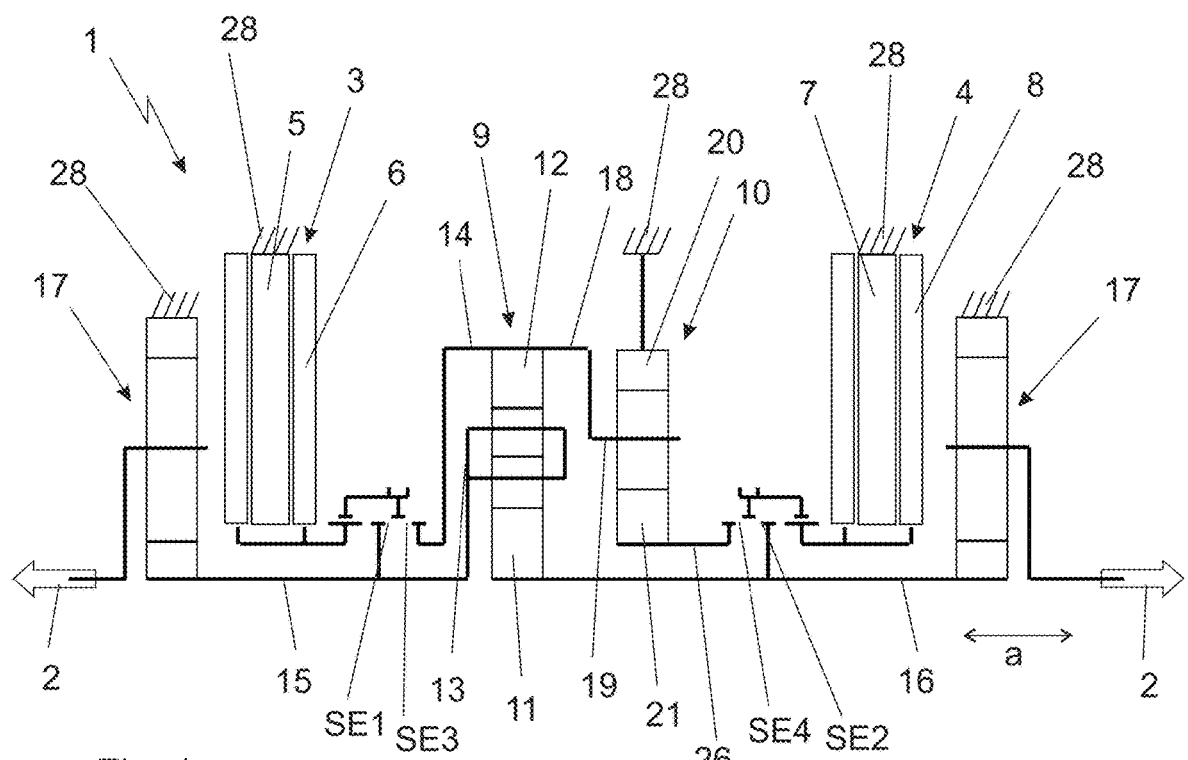

in a rotationally fixed manner with the first differential output shaft. A second switching element couples the second rotor in a rotationally fixed manner with the second differential output shaft. A third switching element couples the first rotor in a rotationally fixed manner with the differential input shaft. A fourth switching element couples the second rotor in a rotationally fixed manner with the transmission input shaft.

7 Claims, 2 Drawing Sheets

(51) Int. Cl.
    *B60K 17/16*     (2006.01)
    *B60K 23/04*     (2006.01)
    *F16H 48/06*     (2006.01)

(56) References Cited

U.S. PATENT DOCUMENTS

| | | |
|---|---|---|
| 10,596,895 B2 | 3/2020 | Morio et al. |
| 11,192,434 B2 | 12/2021 | Hummel et al. |
| 2019/0176609 A1 | 6/2019 | Bando |
| 2019/0283574 A1 | 9/2019 | Hummel |
| 2020/0262293 A1 | 8/2020 | Glückler et al. |
| 2020/0282827 A1 | 9/2020 | Kaltenbach et al. |

FOREIGN PATENT DOCUMENTS

| | | | |
|---|---|---|---|
| CN | 108839548 A | 11/2018 | |
| CN | 111114308 A | 5/2020 | |
| CN | 113173065 A | 7/2021 | |
| DE | 102007021359 A1 | 3/2008 | |
| DE | 102010005789 A1 | 7/2011 | |
| DE | 102011056929 A1 | 6/2013 | |
| DE | 102016218717 B3 | 2/2018 | |
| DE | 102018129175 A1 | 5/2020 | |
| DE | 102019102651 A1 | 8/2020 | |
| DE | 102019202208 A1 * | 8/2020 | ............... B60K 1/02 |
| EP | 3711999 A1 | 9/2020 | |
| JP | 2008120138 A | 5/2008 | |
| JP | 2011033077 A | 2/2011 | |
| JP | 2011131634 A | 7/2011 | |
| JP | 2013204688 A | 10/2013 | |
| JP | 2013253622 A | 12/2013 | |
| JP | 2017053430 A | 3/2017 | |
| WO | 2020108689 A1 | 6/2020 | |
| WO | 2020120721 A1 | 6/2020 | |

OTHER PUBLICATIONS

International Search Report and Written Opinion mailed Nov. 9, 2022 in related/corresponding International Application No. PCT/EP2022/071745.

Office Action created Nov. 24, 2022 in related/corresponding DE Application No. 10 2021 004 237.9.

Office Action created Nov. 3, 2022 in related/corresponding DE Application No. 10 2021 004 236.0.

Wikipedia; "Differentialgetriebe;" May 25, 2021; https://de.wikipedia.org/w/index.php?title=Differentialgetriebe&oldid=212344804.

Office Action dated Jul. 8, 2024 in related/corresponding JP Application No. 2024-509121.

Office Action dated Jul. 8, 2024 in related/corresponding JP Application No. 2024-509122.

Office Action dated Sep. 24, 2024 in related/corresponding U.S. Appl. No. 18/684,357.

* cited by examiner

ELECTRIC DRIVE SYSTEM FOR A MOTOR VEHICLE

BACKGROUND AND SUMMARY OF THE INVENTION

Exemplary embodiments of the invention relate to an electric drive system for a motor vehicle having an electric machine and a differential gear as well as a transmission stage.

DE 10 2007 021 359 A1 describes such an electric drive apparatus having an electric machine and two drive shafts, as well as a first gear reduction planetary gear set driven by the electric machine. This is followed by a compound planetary transmission as differential transmission with a first differential output shaft and a second differential output shaft in order to be able to drive two driven wheels of the vehicle simultaneously.

Exemplary embodiments of the present invention are directed to an improved electric drive system for a motor vehicle enabling a high degree of flexibility when propelling the motor vehicle.

Similarly to the electric drive system in the prior art mentioned above, the electric drive system according to the invention for a motor vehicle provides that a first electric machine and a differential gear having two differential output shafts and a transmission stage is provided. The electric drive system according to the invention then uses an additional second electric machine, wherein the first rotor of the first electric machine can be coupled with the first differential output shaft via a switching element and the second rotor of the second electric machine can be coupled with the second differential output shaft in a rotationally fixed manner via a second switching element. A third switching element enables the connection of the first rotor with the differential input shaft in a rotationally fixed manner, and a fourth switching element enables the coupling of the second rotor, i.e., the rotor of the second electric machine, with the transmission input shaft in a rotationally fixed manner, wherein the transmission output shaft of the transmission stage is connected with the differential input shaft in a rotationally fixed manner.

A rotationally fixed connection in the sense of the present invention is to be understood as a connection between two rotatably mounted elements, wherein these two elements are arranged coaxially to each other and are connected to each other by the rotationally fixed connection in such a way that they rotate at the same angular speed. In the case of a rotationally fixed connection with a stationary element, such as, for example, the housing of a gearbox, this means that the connection is designed in such a way that the element cannot be rotated relative to this housing, i.e., is held firmly on the gearbox housing.

The electric drive system according to the invention for a motor vehicle thus creates the possibility of a single wheel drive by which both output drive shafts, i.e., the first and second differential output shafts, are connected with a side shaft in a rotationally fixed manner, which in turn is connected with the respective wheel directly or according to an advantageous design via further gearing. Therefore, it is possible based on the arrangement according to the invention having the four switching elements to optionally switch between a differential operation with the first electric machine and a differential operation with the second electric machine including a transmission ratio. In addition, an operation in the so-called torque vectoring mode is possible by which a single wheel drive of each driven wheel is created via one of the two electric machines.

Thus, a plurality of different functions can be realized with a simple to realize and compact design. For example, a journey in normal differential operation can take place via the first electric machine, whereby the second electric machine can be decoupled to increase the efficiency of the electric drive system. The second electric machine can be geared via the transmission stage for a higher torque in normal differential operation, wherein in this case the first electric machine can be disengaged to increase efficiency. During a start-up mode, the two electric machines can be driven for a high torque, wherein the first electric machine is used directly and the second electric machine is geared via the transmission stage. Furthermore, a single wheel drive is provided for a pure torque vectoring operation.

Overall, it is possible to switch between the individual modes, i.e., an efficiency mode with the first electric engine, an efficiency mode with the second electric engine, and the start-up mode or torque mode, without interrupting the load.

According to an extremely favorable development of the electric drive system according to the invention, it is possible that the transmission stage is arranged at least partially axially in relation to the differential gear.

An at least partially axially overlapping arrangement of two elements is to be understood in the sense of the present invention that at least a part of the one element and a part of the other element are arranged in the same plane aligned perpendicular to the axial direction or intersects this plane. The axially overlapping parts are thus necessarily arranged in different radial intervals and/or angular positions relative to the corresponding axis defining the axial direction. The axial direction is thus defined by the two differential output shafts arranged, particularly advantageously coaxially, or at least axially parallel to the rotor axes of the two electric machines. Particularly advantageously, the first rotor and the second rotor are arranged coaxially to each other.

This axially overlapping arrangement of the transmission stage to the differential gear can mean, in the case of a bevel gear differential for example, that at least a part of the transmission stage is placed axially overlapping the differential cage of this differential gear. Overall, this creates a very compact design in the axial direction.

A further very favorable design of the electric drive system according to the invention can further provide that the fourth switching element is arranged at least partially axially overlapping the differential gear. Therefore, this switching element requires less or no installation space of its own in the axial direction.

Further advantageous embodiments of the electric drive apparatus according to the invention can further provide that the second switching element, the third switching element, and/or the first switching element are also arranged at least partially axially overlapping the differential gear. All of this contributes to the compact design of the electric drive system according to the invention.

A further very favorable embodiment of the electric drive system according to the invention can, as is already indicated above, provide that the differential gear is formed as a bevel gear differential with a differential cage. In the advantageous embodiments described above, this differential cage would then be the element relative to which the transmission stage and/or the switching elements are arranged in an axially overlapping manner.

As an alternative to this embodiment of the differential gear as a bevel gear differential, it can also be provided according to an alternative advantageous development of the electric drive system according to the invention that the differential gear is formed as a planetary differential.

In a first advantageous form, this planetary differential comprises an internal gear, a double planetary carrier, and a sun gear, wherein the differential input shaft is connected with the internal gear in a rotationally fixed manner, the first differential output shaft is connected with the double planetary carrier in a rotationally fixed manner, and the second differential output shaft is connected with the sun gear in a rotationally fixed manner. As a result, an efficient design of the planetary differential is created. In the axial direction, the planetary differential is thus inherently more compact than the bevel gear differential, such that its application ideally supports or expands the axially compact design.

In a second similarly advantageous form, the planetary differential comprises a first sun gear, a second sun gear, a double planetary carrier assigned to the first sun gear, and a simple planetary carrier assigned to the second sun gear, wherein the double planetary carrier is connected with the simple planetary carrier in a rotationally fixed manner and wherein a long planetary gear of the double planetary carrier meshes with the second sun gear, wherein the long planetary gear meshes with a short planetary gear of the double planetary carrier, and wherein the short planetary gear meshes with the first sun gear. Thus, the differential input shaft is connected with the double planetary carrier in a rotationally fixed manner, the first differential output shaft is connected with the first sun gear in a rotationally fixed manner, and the second differential output shaft is connected with the second sun gear in a rotationally fixed manner.

A further extremely favorable embodiment of the electric drive system according to the invention can further provide that the transmission stage has a planetary gear set with a first element, a second element, and a third element, wherein the third element is connected with a housing in a rotationally fixed manner, the second element is connected with the transmission output shaft in a rotationally fixed manner, and the first element is connected with the transmission input shaft in a rotationally fixed manner. The individual elements are thus formed by a sun gear, a simple or double planetary gear carrier, and an internal gear, which can be interconnected in different variations in order to achieve the desired transmission ratio, here, in particular, a transmission ratio for a higher drive torque. Thus, for example, the first element could be formed by the sun gear, the second element could be formed by the planetary carrier, and the third element could be formed by the internal gear. However, other variations are similarly conceivable and sensible.

An advantageous development of the electric drive system according to the invention provides that the differential output shafts are connected via a respective transmission ratio with at least one respective driven wheel. These additional transmission ratios could, for example, be formed as a spur gear stage, planetary gear set or similar and create further flexibility and variability in the constructive implementation of the connection between the differential output shafts and the driven wheel. Therefore, the transmission ratios are typically predefined by design and thus do not allow changes, but accordingly do not require any switching elements or similar.

At least one of the electric machines can be, according to a very advantageous development, an axial flux machine, which accordingly can be realized in a compact manner and with a high-power density that again saves weight.

Therefore, the used switching elements can be formed at least partially, preferably all of them, as positive locking elements. This makes the design extremely simple and compact, whereby the change between the individual already described above modes can take place without tractive force interruption, such that a tractive force interruption is only necessary when changing from the use of the differential gear into the additional possible single wheel drive in the torque vectoring mode.

Further advantageous embodiments of the electric drive system according to the invention result from the embodiments which are described in more detail below with reference to the figures.

BRIEF DESCRIPTION OF THE DRAWING FIGURES

Figure 2:
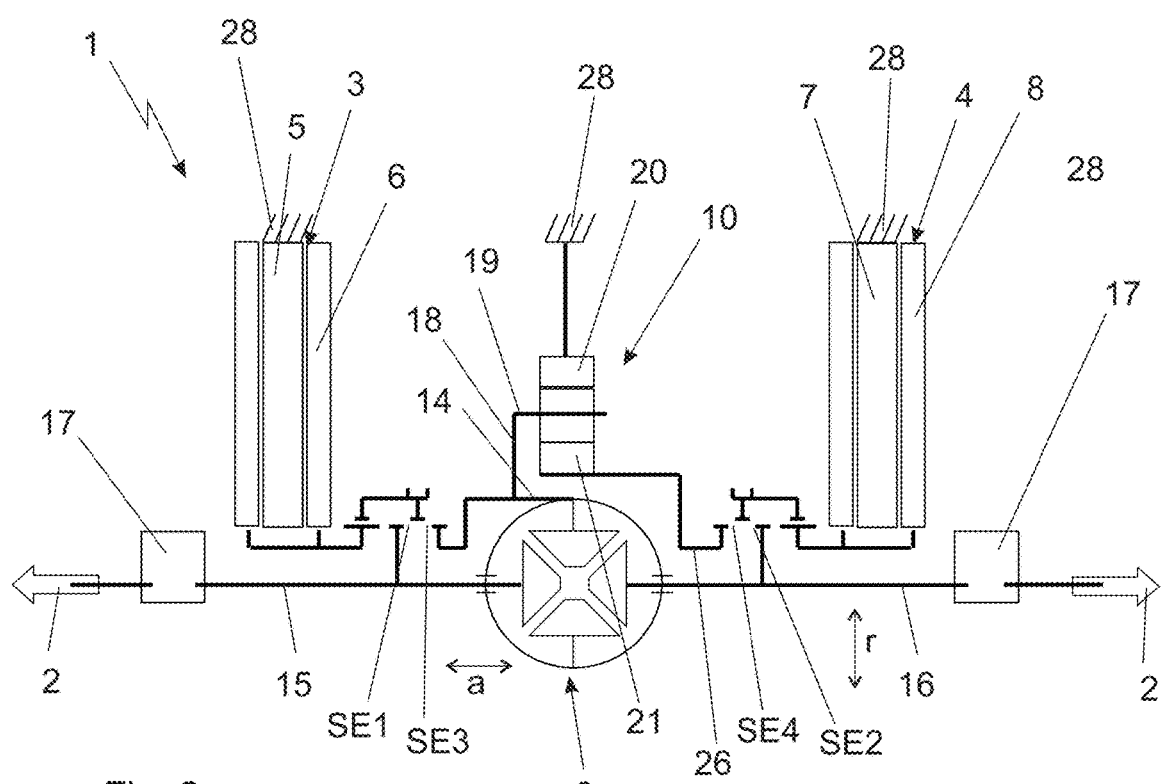
Figure 3:
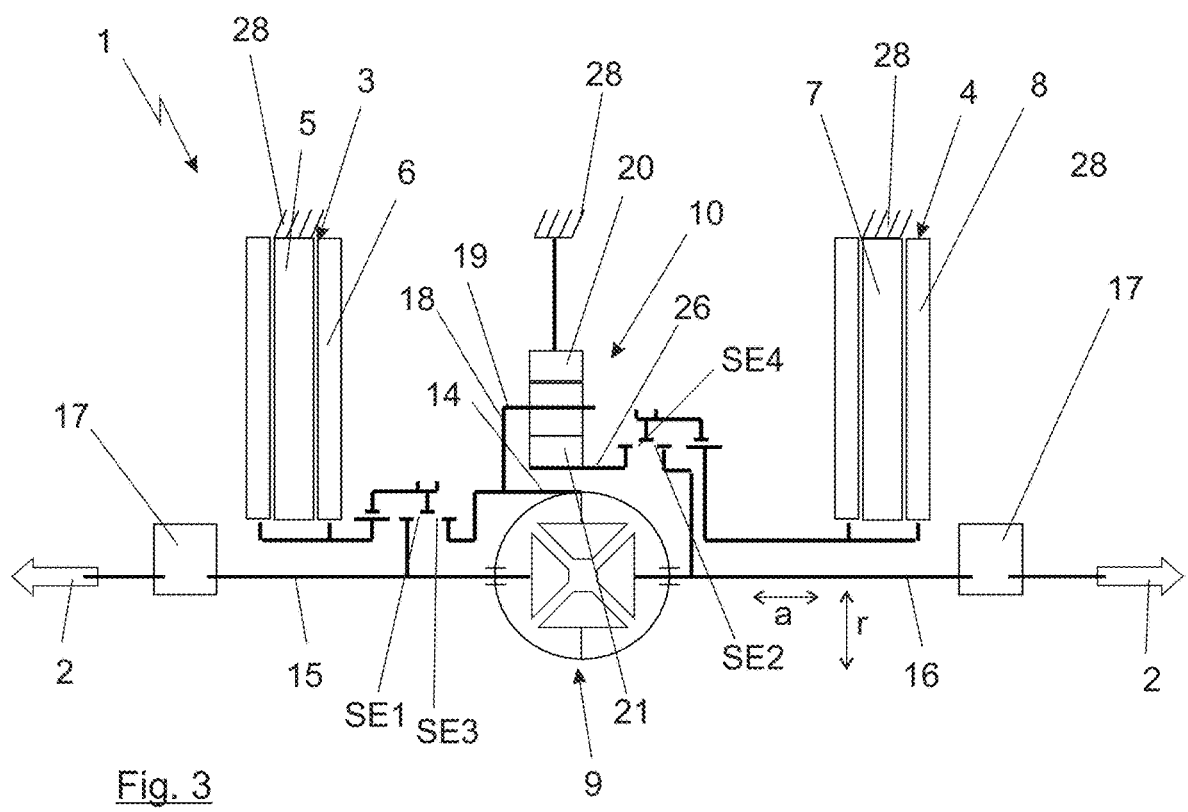

Shown here are:

FIG. 1 a first possible exemplary embodiment of an electric drive system according to the invention;

FIG. 2 a second possible exemplary embodiment of an electric drive system according to the invention; and FIG. 3 a third possible exemplary embodiment of an electric drive system according to the invention.

DETAILED DESCRIPTION

FIG. 1 illustrates a first possible embodiment of an electric drive system 1. This electric drive system 1 serves to drive a motor vehicle and can provide drive power for two driven wheels 2, this being indicted here by the arrows. The electric drive system 1 is equipped with a first electric machine 3 and a second electric machine 4, which, for example, can be axial flux machines. The first electric machine 3 comprises a stator 5 fixed to the housing and a first rotor 6, and the second electric machine 4 accordingly comprises a stator 7 fixed to the housing and a second rotor 8. The two electric machines 3, 4, more specifically the two rotors 6, 8 thereof, are thus arranged coaxially to a rotational axis formed here by the lower boundary of the illustration in FIG. 1, as the illustration in FIG. 1 only illustrates the upper half of the otherwise rotationally symmetrical design. This rotational axis of the two rotors 6, 8 simultaneously defines an axial direction a of the electric drive system 1. A radial direction r, which is shown in FIGS. 2 and 3, is perpendicular to it.

Along with the two electric machines 3, 4, the electric drive system 1 furthermore comprises a differential gear 9 as well as a transmission stage 10.

The differential gear 9 and the transmission stage 10 are also arranged coaxially to the rotational axis of the rotors 6, 8.

The differential gear 9 is formed here in the illustration of FIG. 1 by way of example as a planetary differential and comprises a sun gear 11, an internal gear 12 and a double planetary carrier 13 with the corresponding planet gears (not explicitly provided here with a reference number). A differential input shaft 14 is connected with the internal gear 12 in a rotationally fixed manner. A first differential output shaft 15 is connected with the double planetary carrier 13 in a rotationally fixed manner, and the sun gear 11 is connected with a second differential output shaft 16 in a rotationally fixed manner. The two differential output shafts 15, 16 are connected in the illustrated exemplary embodiment with the respective driven wheel 2 via a respective transmission ratio 17. The differential input shaft 14 is now further connected with a transmission output shaft 18 of the transmission stage 10. The transmission stage 10 is preferably, as illustrated here, formed as a planetary gear set, in the case of which, in the illustration of FIG. 1, the planetary carrier 19, which could also be a double planetary carrier, is coupled with the transmission output shaft 18 and thus with the differential input shaft 14 in a rotationally fixed manner. An internal gear 20 of the transmission stage 10 is connected with the housing 28 in a rotationally fixed manner, a sun gear 21 of the transmission stage 10 can be connected with the second rotor 8 via a transmission input shaft 26.

A design having a first switching element SE1 and a third switching element SE3 can now be seen in the axial direction a between the first electric machine 3 and the differential gear 9. This design corresponds essentially to the design having a second switching element SE2 and a fourth switching element SE4, the design being located in the axial direction a between the transmission stage 10 and the second electric machine 4. The first electric machine 3 or its rotor 6 can now be connected with the first differential output shaft 15, which could also be referred to as a side shaft or merges into such in a rotationally fixed manner, via the first switching element SE1. Accordingly, the second electric machine 4 or its rotor 8 can be connected with the second differential output shaft 16 or side shaft via the second switching element SE2. Therefore, a single wheel drive can be realized with torque vectoring, by which the first electric machine 3 drives the one driven wheel 2 and the second electric machine 4 drives the other driven wheel 2 independent from the respective other wheels. The first electric machine 3 or its rotor 6 can now be coupled with the differential input shaft 14 in a rotationally fixed manner via the third switching element SE3. The first electric machine 3 then drives, for example alone or supported by the second electric machine 4, the two differential output shafts 15, 16 directly and thus the wheels 2 via the two transmission ratios 17.

The first switching element SE1 and the third switching element SE3 are thus formed in such a way that they can also completely decouple the first electric machine 3. In this mode, a connection can be achieved between the second rotor 8 of the second electric machine 4 and the differential input shaft 14 via the transmission stage 10 by coupling the fourth switching element SE4. The second electric machine 4 then drives the two differential output shafts 15, 16 and thus the wheels 2 with the corresponding transmission ratio via the transmission stage 10.

The second electric machine 4 can likewise be decoupled via the second and fourth switching element SE2, SE4, such that in this differential operation with a typically even distribution of the drive power on the two differential output shafts 15, 16, efficient operation is possible both with the first electric machine 3, with the second electric machine 4 decoupled, or vice versa with the second electric machine 4, via the transmission stage 10 with the first electric machine 3 decoupled. Furthermore, a torque mode for providing higher torques is possible, in which the two electric machines 3, 4 drive the differential input shaft 14, the first electric machine 3 directly and the second electric machine 4 via the transmission stage 10.

As an alternative, to the design illustrated in FIG. 1, other connections could also be implemented in the area of the transmission stage 10. For example, the planetary carrier 19, which can also be formed as a double planetary carrier, could be immobilized relative to the housing 28, instead of coupling the transmission output shaft 18 with the internal gear 20 in a rotationally fixed manner, such that this drives the differential input shaft 14 whilst a transmission input shaft 26 is still coupled with the sun gear 21. A further alternative could also provide for immobilizing the sun gear 21 on the housing and then, for example, coupling the transmission input shaft 26 with the internal gear 20 in a rotationally fixed manner and the transmission output shaft 18 in turn via the planetary carrier 19. These two elements could also be reversed again, such that the planetary carrier 19 would be coupled to the transmission input shaft 26 and the internal gear 20 would be coupled to the transmission output shaft 18 again accordingly.

In addition to this design of the electric drive system 1 with a planetary differential 9, a design in which the differential gear 9 is designed as a bevel gear differential would also be conceivable. In the illustration in FIG. 2, a corresponding design is shown. The design otherwise corresponds to what has already been described such that the following text only discusses the differences in more detail. The differential gear 9 is formed as a bevel gear, so that a differential cage 27 is driven by the differential input shaft 14, which cage drives bevel gears connected to it, which gears drive the differential output shafts 15, 16 via other bevel gears. In the illustration in FIG. 2, the two transmission ratios 17 are only indicated schematically. These could also, as designed in the illustration in FIG. 1, be formed as planetary gear sets, or alternatively as a spur gear or similar. In principle, alternatives would be conceivable here, both with the design of the electric drive system 1 in FIG. 2 as well as that in FIG. 1, for example chains, belts, or different gear elements for the transmission ratios 17.

The two electric machines 3, 4 are constructed in a comparable manner, as in the illustration of the electric drive system 1 in FIG. 1, as are the switching elements SE1 to SE4. In contrast to the illustration in FIG. 1, in which the differential gear 9 and the transmission stage 10 were arranged next to each other in the axial direction a, the differential gear 9 and the transmission stage 10, in the design illustrated in FIG. 2, are now arranged overlapping each other in the axial direction. The transmission stage 10, which is formed again here purely exemplarily as a planetary gear set, is located axially overlapping the differential cage 27, such that they share at least one common plane, perpendicular to the axial direction a. In the radial direction r, the transmission stage 10 is thus arranged outside of the differential cage 27. Alternatives could also be implemented for the transmission stage 10, for example the alternatives described in the context of FIG. 1 for the interconnection of the individual elements 19, 20, 21 and the transmission stage 10, which is designed as a planetary gear set. Alternatively, both here and in the design already described in FIG. 1, it would be conceivable to realize the transmission stage 10 in a different way, for example as a spur gear stage, chain drive, belt drive or similar.

With regards to the interconnection between the individual modes using the switching elements SE1 to SE4, the above also applies here. The switching elements SE1 to SE4 could respectively be designed as positive locking elements, which accordingly also applies for the design of the electric drive system 1 in FIG. 1. Between the individual modes, in which the power is distributed onto the two driven wheels 2 via the differential gear 9, a switching without interrupting the tractive load is then still possible, as the necessary adjustments/supports can be made with regards to the rotational speed and/or the power flow via the two electric machines 3, 4. The very simple and efficient positive locking elements as switching elements SE1 to SE4 enable such a very efficient and wear-free design. Only with switching into the single wheel drive in the torque vectoring mode, in which the first electric machine 3 drives the first differential output shaft 15 and the second electric machine 4 drives the second differential output shaft 16, in which the first switching element SE1 and the second switching element SE2 are accordingly closed, would a tractive force interruption then would be necessary.

In the illustration of FIG. 3, a further alternative to the design described in FIG. 2 is now shown. This alternative differs in that the arrangement of the second switching element SE2 and the fourth switching element SE4 is shifted from the position arranged axially between the differential gear 9 and the second electric machine 4, such that the second switching element SE2 and the fourth switching element SE4 are now arranged axially overlapping the differential gear 9, in this case in particular its differential cage 27, in a similar way to the transmission stage 10.

Alternatively, or, in principle, additionally, the first switching element SE1 and the third switching element SE3 could also be moved to such a position axially overlapping the differential gear 9, which could be done as an alternative or in addition to an arrangement of the transmission stage 10 axially overlapping the differential gear 9.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An electric drive system for a motor vehicle, the electric drive system comprising:
    a first electric machine having a first rotor;
    a differential gear having a differential input shaft, a first differential output shaft, and a second differential output shaft, wherein the first and second differential output shafts are arranged coaxially to the first rotor;
    a transmission stage having a transmission input shaft and a transmission output shaft, wherein the transmission output shaft is connected in a rotationally fixed manner with the differential input shaft;
    a second electric machine having a second rotor;
    a first switching element configured to couple the first rotor with the first differential output shaft in a rotationally fixed manner;
    a second switching element configured to couple the second rotor with the second differential output shaft in a rotationally fixed manner;
    a third switching element configured to couple the first rotor with the differential input shaft in a rotationally fixed manner; and
    a fourth switching element configured to couple the second rotor with the transmission input shaft in a rotationally fixed manner,
    wherein the transmission stage has a planetary gear set with a first element, a second element, and a third element, wherein the third element is connected with a housing in a rotationally fixed manner, the second element is connected with the transmission output shaft in a rotationally fixed manner, and the first element is connected with the transmission input shaft in a rotationally fixed manner,
    wherein the transmission stage is arranged at least partially axially overlapping the differential gear, and
    wherein the fourth switching element is arranged at least partially axially overlapping the differential gear.

2. The electric drive system of claim 1, wherein the second switching element is arranged at least partially axially overlapping the differential gear.

3. The electric drive system of claim 1, wherein the third switching element is arranged at least partially axially overlapping the differential gear.

4. The electric drive system of claim 1, wherein the first switching element is arranged at least partially axially overlapping the differential gear.

5. The electric drive system of claim 1, wherein the differential gear is formed as a bevel gear differential with a differential cage.

6. The electric drive system of claim 1, wherein the first and second differential output shafts are each connected with at least one driven wheel via a respective transmission.

7. The electric drive system of claim 1, wherein at least one of the first and second electric machines is an axial flux machine.

* * * * *